(No Model.)
J. B. LISLE.
COTTON CHOPPER.
No. 259,770. Patented June 20, 1882.
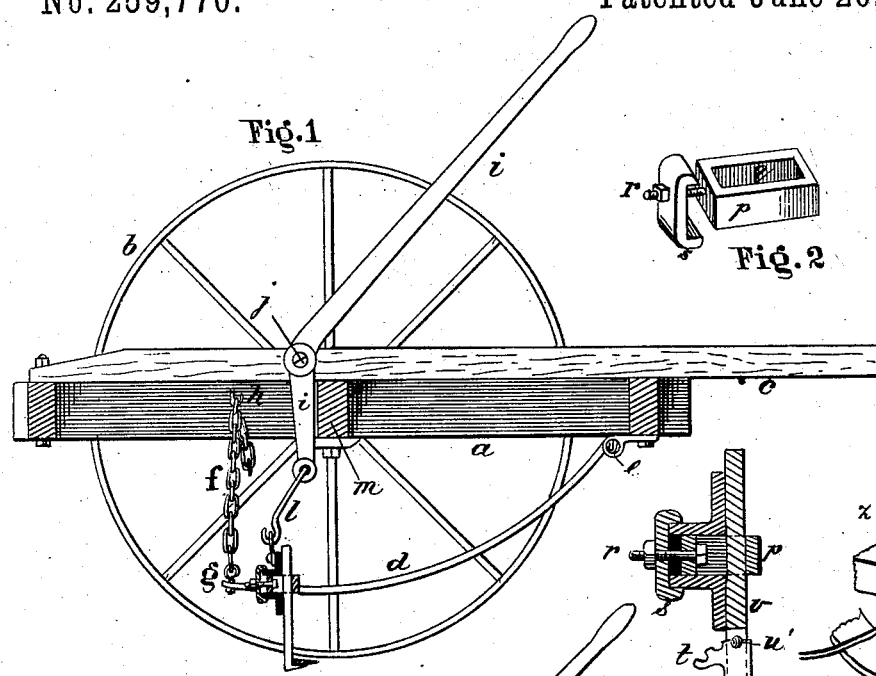
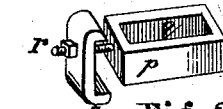
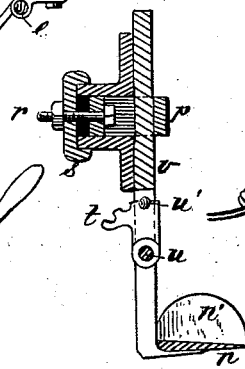
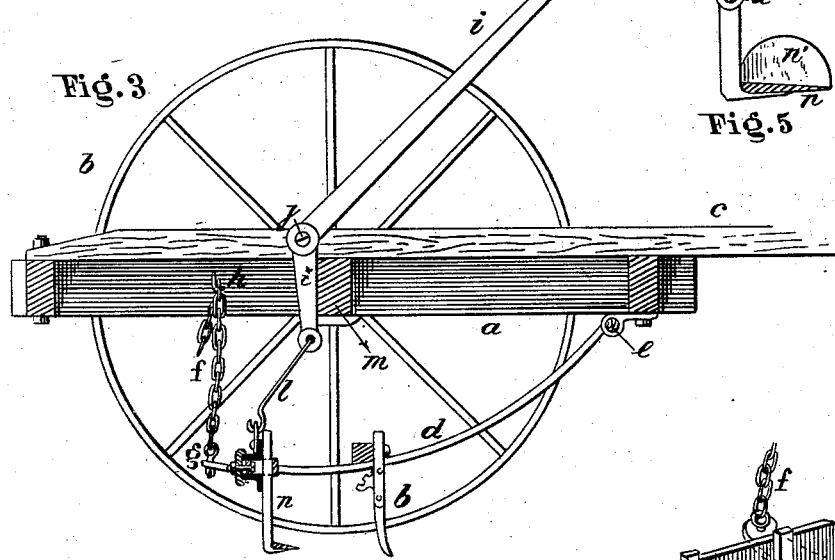
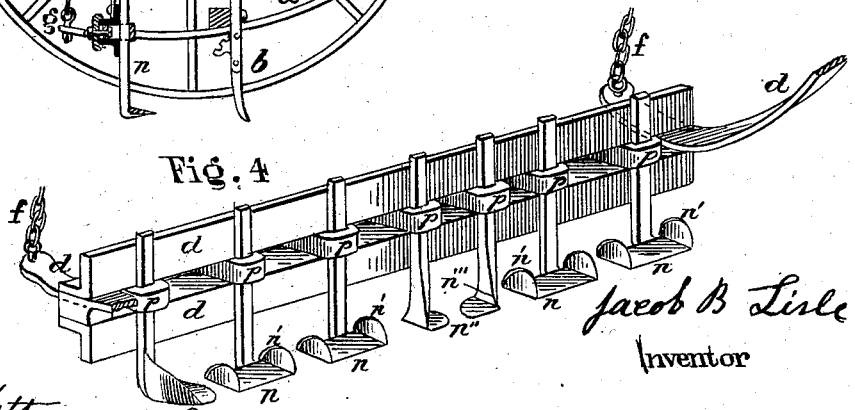
Jacob B. Lisle
Inventor
Attest

United States Patent Office.

JACOB B. LISLE, OF SPRINGFIELD, OHIO, ASSIGNOR TO HIMSELF AND WILLIAM J. IRWIN, OF SAME PLACE.

COTTON-CHOPPER.

SPECIFICATION forming part of Letters Patent No. 259,770, dated June 20, 1882.

Application filed November 23, 1881. (No model.)

*To all whom it may concern:*

Be it known that I, JACOB B. LISLE, of Springfield, county of Clarke, State of Ohio, have invented a new and useful Improvement in Combined Cotton-Choppers and General Cultivators, of which the following is a specification.

In the accompanying drawings, Figure 1 is a side sectional elevation of a cotton-chopper of my invention. Fig. 2 is a perspective view of a detached hoe-holder. Fig. 3 is a side sectional elevation, illustrative of a modification that may be made in the arrangement of hoes in my improved cotton-chopper without materially diverging from the preferred mechanical construction and arrangement of parts. Fig. 4 is a perspective view of the detached vertically-adjustable hoe-holder. Fig. 5 is a transverse sectional elevation through the hoe-bar, showing a modification in the construction of the hoe for the purpose of permitting of a separate tilting arrangement of each hoe. Fig. 6 is a perspective view of a device that may be applied to the drag-bars for raising and lowering the forward ends of the said drag-bars. Fig. 7 is a perspective view of a colter that may be substituted for the hoe if it should be desired to use the machine as a cultivator, and Fig. 8 is a diagram illustrating the manner of applying my invention to the proper separation of cotton-plants.

My invention relates to that class of agricultural implements known as "cotton-choppers;" and it consists, first, in an improved mode of joining the hoe-bar to the main frame of the machine, whereby a rigid or a yielding vertical adjustment can be instantly attained; second, in the construction and arrangement of the hoe or colter holders and the hoe-bar, whereby the ready transposition from a cotton-chopper to a cultivator may be made, or the distance between the hoes or colters changed by addition or subtraction in the number of hoes or colters to or from said hoe-bar.

To enable others skilled in the art to make and use my invention, I will proceed to describe its construction and operation.

I make my machine of the general form of the ordinary cotton-chopper, providing it with the ordinary parts thereof—as a frame, *a*, traveling-wheels *b*, and pole *c*. To the front of the frame *a*, I pivot drag-bars *d* by means of wooden pins *e* or their equivalent, whereby said drag-bars are attached to said frame by connections whose shearing strength is but slightly in excess of that required to pull the hoes through ordinary ground at the usual depth of cut, and whose resistance would be overcome when opposed by unusual obstructions, and the drag-bar, with its connected hoe-bar, cut loose from machine, and the edges and general arrangement of the hoes be thus maintained.

I attach the rear ends of the drag-bars *d* to the main frame through the agency of chains *f*, provided with eyebolts, *g*, by which they are connected to said drag-bars, and with hooks *h*, by means of which they may be attached to the main frame at any desirable elevation. I also connect the rear ends of the drag-bars through the agency of the hoe-bar, to which they are both securely attached, with a lever, *i*, pivoted at *j* to the tongue *c*, and to said hoe-bar at or near its center through the agency of a link, *l*.

It will be observed that when the lever *i* is at rest in the position illustrated, with its link end resting against the cross-brace *m* of the main frame, the hoe-bar is rigidly held to its work, and when it becomes desirable to raise said hoe-bar it can be accomplished by tilting the lever *i* toward the front end of the machine, where it may be permanently retained by joining a convenient link in the chain *f* to the hook *h*.

The hoes *n* or colters *o* are attached to the hoe-bar in the following manner: The hoe-bar is preferably constructed of two pieces of angle-iron in a manner clearly shown in the drawings, with the horizontal faces of said angle-irons separated sufficient to admit the hoe-holders, which will be referred to hereinafter, and the drag-bars *d*, said drag-bars being permanently attached thereto by rivets or bolts, as the manufacturer may elect. The hoe-holders consist of a rectangular box, *p*, having an opening, *q*, for the reception of the hoe-shank, a draw-bolt, *r*, by means of which the shanks of the hoes may be drawn tightly against the vertical sides of the angle-irons that form the hoe-bar, and a cap, s, provided with cleats fitting over the edges of the angle-irons in the manner shown. (See Figs. 2 and 5.)

It will be noticed that by loosening the nut of the draw-bolt r on either of the hoe-holders the hoe may be instantly removed, as may also the holder itself. By this means the hoes may be spread apart to suit varying conditions.

If it is desirable to give the hoes a greater tilt than that which could be obtained by the lowering of the hoe-bar, the hoes may be provided with a toothed quadrant, t, pivoted by pin u, and held to place by wooden pins u', passing through a jaw made by bifurcating the lower end of the hoe-shank v. (See Fig. 5.) By this means the tilt of the hoe can be arranged to suit the operator, and the wooden retaining-pin u' will provide a sufficient resistance for all ordinary demands, and at the same time provides a separate and independent safety device for each hoe when run against unusual obstructions. The tilting of the hoes may be attained also by the arrangement shown by Fig. 6, in which the front ends of the drag-bars are represented as attached to the main frame by means of a slotted piece, w, which is firmly secured to the main frame a. The piece w is also provided with a toothed quadrant, x, a lever, y, having a spring-pawl, z, and links a', that connect with the ends of the drag-bar d. By this arrangement the hoes may be tilted up or down by raising or lowering the ends of the drag-bars in the slotted pieces w.

A very important feature of this invention is that of providing the hoes n with vertical cutting-edges n', by which means a clean vertical cut will be made in the ground and through the plants, and thus obviate what might otherwise be an irregular and unsatisfactory separation of plants. In Fig. 3 of the drawings I have illustrated a modification of this feature of providing means for a vertical cut by arranging the hoes n in the hoe-bar in the manner before explained, but substituting forward vertical cutters, b', for the parts n' of the hoes n; or hoes may be made with triangular horizontal cutters having the front edges of their shanks formed as cutters, as shown by the middle hoes, n'' n''', in Fig. 4.

Another modification of the tilting of the hoe-bar may be made by pivoting said hoe-bar to the rear ends of the drag-bars and tilting the hoe-bar by means of a spring-lever similar to that shown in Fig. 6, said lever being rigidly attached to the hoe-bar, while the toothed sector x is rigidly attached to the drag-bar.

Having thus described my invention, what I claim as new, and desire to secure by Letters Patent, is—

1. In a cotton-chopper, a holder, dd, suspended by two drag-bars, d, the movable sockets p, and cutters n n', in combination with a lever, i, link l, chain f, and hook h, as and for the purpose specified.

2. A cotton-chopper provided with a holder, dd, flexibly connected to the frame, having a longitudinal slot for the reception of a series of movable sockets, p, in combination with a series of cutters, n n', as and for the purposes specified.

3. A cotton-chopper provided with the sockets composed of parts p q r s, in combination with a slotted holder, dd, suspended by hinged bars, and cutters n n', substantially as and for the purpose specified.

In testimony whereof I have hereunto set my hand this 7th day of November, 1881.

JACOB B. LISLE.

Witnesses:
GEO. DAVIDSON,
JOHN FITZPATRICK.